United States Patent [19]

Brix et al.

[11] Patent Number: 4,459,331

[45] Date of Patent: Jul. 10, 1984

[54] FULL DOOR PANEL AND METHOD OF FABRICATION THEREOF

[75] Inventors: James M. Brix, Strafford; Harold W. Swenson, Dover, both of N.H.

[73] Assignee: Ex-Cell-O Corporation, Troy, Mich.

[21] Appl. No.: 425,684

[22] Filed: Sep. 28, 1982

[51] Int. Cl.³ .................... B32B 1/04; B32B 3/08; B32B 3/10

[52] U.S. Cl. ........................... 428/71; 156/79; 156/250; 428/76; 428/138; 428/159; 428/188

[58] Field of Search .............. 156/250, 293, 294, 79; 280/751; 296/71, 146; 428/68, 71, 76, 159, 160, 137, 138, 316.6, 188

[56] References Cited

U.S. PATENT DOCUMENTS

| | | | |
|---|---|---|---|
| 2,976,577 | 3/1961 | Gould | 156/79 |
| 3,123,403 | 3/1964 | Hood | 297/412 |
| 3,549,441 | 12/1970 | Mesinger et al. | 156/79 |
| 3,989,275 | 11/1976 | Finch et al. | 428/159 |
| 3,991,146 | 11/1976 | Barrie | 428/71 |
| 4,021,072 | 5/1977 | Belanger | 296/71 |
| 4,268,557 | 5/1981 | Bracesco | 156/79 |

*Primary Examiner*—William J. Van Balen
*Attorney, Agent, or Firm*—Harold W. Milton, Jr.

[57] ABSTRACT

The vehicle panel, such as a door panel with a pull handle, is formed from a skin with a cover portion (18) and a loop portion (12) connected by spaced sides (32). A reinforcement member (24) is disposed inside the loop portion (12) and supported by a support panel (22). Cellular material (30) is disposed along the cover portion (18) of the skin and through the channel of the spaced sides (32) into the loop portion (12). The spaced sides (32) of the skin and the cellular material (30) disposed therein are removed to define the loop portion (12) integral with the body portion (14). Cover plates (38) are secured to the reinforcement member (24) to cover the exposed areas of cellular material (30) where the spaced sides (32) of the skin and cellular material (30) have been removed.

8 Claims, 6 Drawing Figures

FULL DOOR PANEL AND METHOD OF FABRICATION THEREOF

TECHNICAL FIELD

The subject invention relates to a full door panel and the method of fabrication. More specifically, the subject invention is directed to a vehicle panel including a body portion and a loop portion integral with each other, such as a door panel with a pull handle attached thereto.

BACKGROUND ART

Vehicle door panel assemblies typically include armrests and/or pull handles. Many assemblies incorporate reinforcement means within foam padding to provide strong, yet luxurious, armrests and pull handles. The U.S. Pat. No. 3,123,403 to Hood reveals an armrest that includes a member that reinforces spongy core material. The U.S. Pat. No. 4,021,072 to Belanger teaches an automobile inner door pull with soft molding encasing a metal strip, such that it is comfortable to grasp, yet sturdy. Heretofore, door panels have been fabricated and then pull handles, or the like, are separately attached to the panel. This requires multiple fabrication stations in addition to the requirement to assemble the components.

STATEMENT OF INVENTION AND ADVANTAGES

In accordance with the subject invention, there is provided a vehicle panel and the method of fabrication. More specifically, the subject invention relates to a vehicle panel having a cellular core covered by a flexible skin with an integral loop defining an endless opening. The skin is formed to include a cover portion and a loop projection defining a loop cavity extending from the cover portion. Cellular material is disposed along and adjacent the cover portion and into the loop cavity. The portion of the skin and cellular material between the outer periphery of the loop projection and the cover portion is removed to define the endless opening.

In accordance with the subject invention, there is provided a vehicle panel in which the loop portion is integral with the body portion, and a method of fabrication of the vehicle panel in which a single mold is used to fabricate an integral panel, eliminating assembly steps while keeping waste material to a minimum level.

Other advantages of the present invention will be readily appreciated as the same becomes better understood by reference to the following detailed description when considered in connection with the accompanying drawings wherein.

Figure 3:
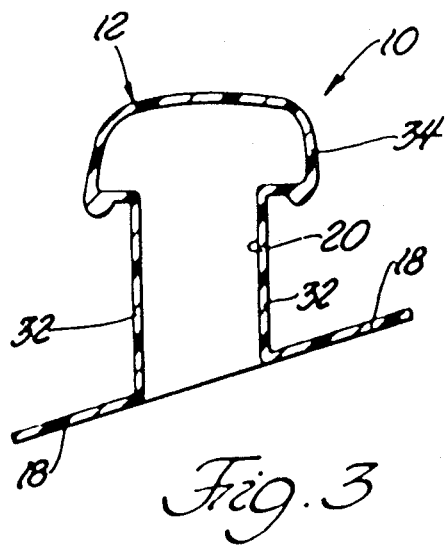
FIG. 3 is a cross-sectional view of the skin prior to adding cellular material.
Figure 4:
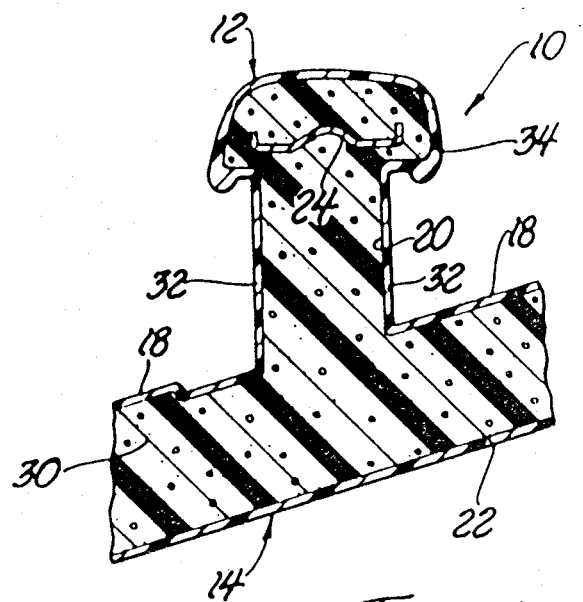
FIG. 4 is a cross-sectional view of the vehicle panel after cellular material, the reinforcement member and the support panel have been added to the skin.

A vehicle panel constructed in accordance with the subject invention is generally shown at 10. A loop portion generally indicated at 12 is connected to a body portion 14 to define an endless opening 36 therebetween. A flexible skin forms the exterior of the vehicle panel in all areas with the exception of areas covered by a decorative applique 16 positioned at the back or base of the pocket of the panel. As best illustrated in FIG. 3, the skin includes a cover portion 18 and the loop portion 12. Taken together, the cover portion 18 and the loop portion 12 form a loop cavity 20. In other words, the loop portion 12 is not pinched or sealed off from the body portion 18, but rather both the loop portion 12 and the body portion 18 taken together define a continuous volume.

A metal or rigid plastic support panel 22 is disposed proximate to the body cover 18, while a loop reinforcement member 24 is inserted in the loop portion 12. The loop reinforcement member 24 abuts the support members 26 and 28 which are supported by the support panel 22 by brackets 42 and 44. Thus, a body portion 14 is defined by the support panel 22 and the cover portion 18, while the loop portion 12 has a reinforcement member 24 placed therein. The loop reinforcement member 24 is made of any material that is rigid or flexible and capable of carrying a load for pulling a vehicle door closed. Cellular material 30 is then disposed along and adjacent the cover portion 18 and into the loop cavity 20. The cellular material 30 may be a reaction injected foam.

The loop projection 12 is formed with spaced sides 32 in the skin and an enlarged head 34. The spaced sides 32 extend between the cover portion 18 and the enlarged head 34, so that when the cellular material 30 is injected into the mold it flows unrestrained into and along both the cover portion 18 and between the sides 32 into the enlarged head 34. The sides 32 may be of any orientation, so long as there exists a sufficient passageway between the cover portion 18 and the enlarged head 34 for the cellular material 30 to flow.

Figure 1:
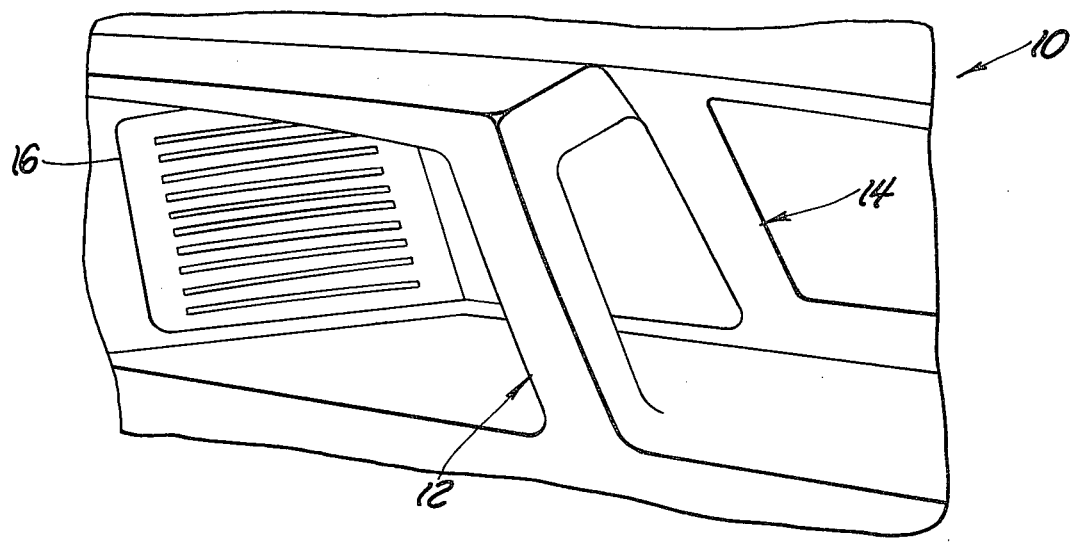
FIG. 1 is a fragmentary perspective view of a vehicle panel constructed in accordance with the subject invention.
Figure 2:
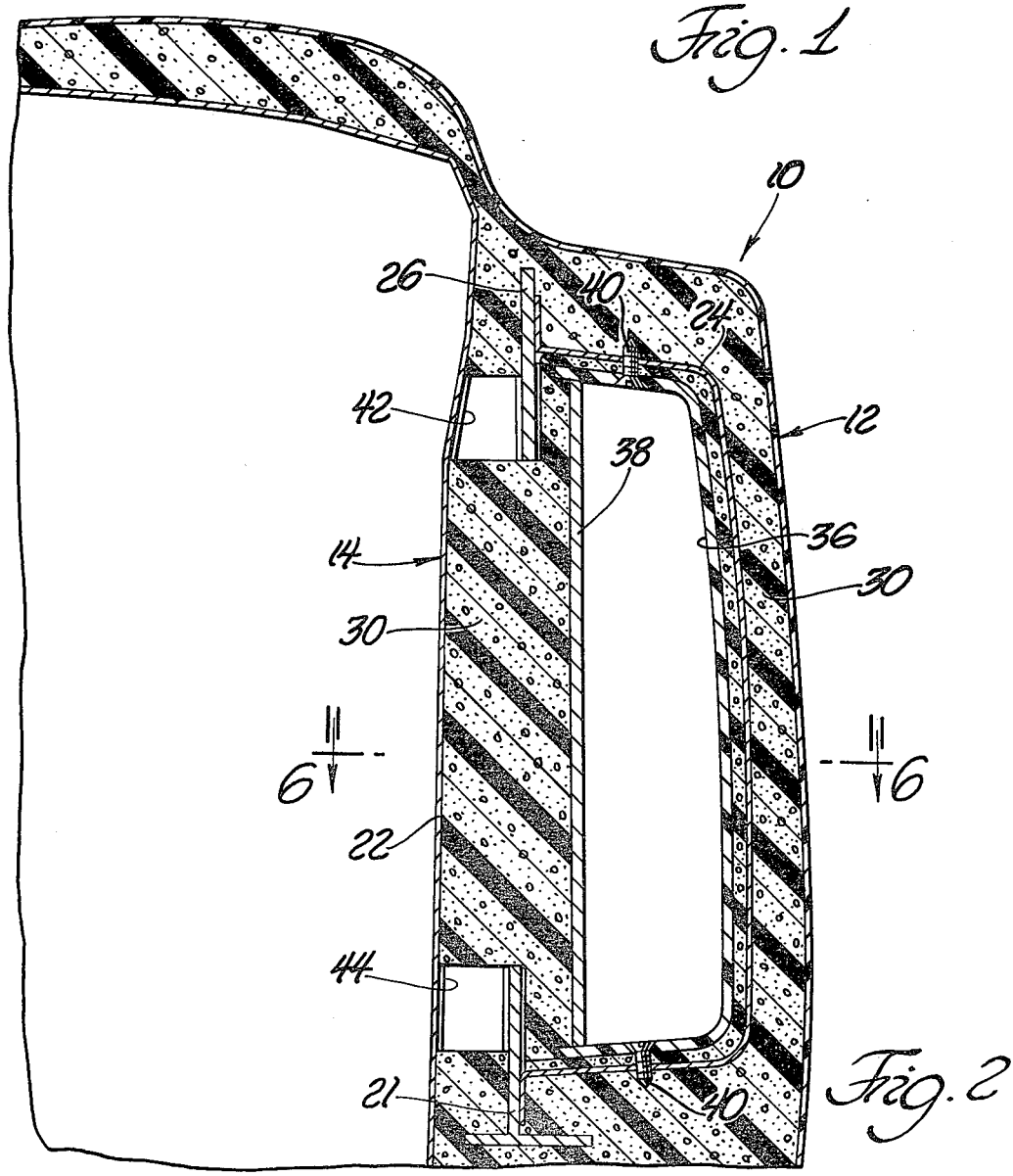
FIG. 2 is a transverse cross-sectional view of a vehicle panel constructed in accordance with the subject invention.

The portion of the skin and cellular material 30 formed between the outer periphery of the loop portion 12 and the cover portion 18 is then removed. Upon removal of this section of the vehicle panel, there is formed an endless opening 36 between the cover portion 18 and the enlarged head 34. As best illustrated in FIG. 2, this endless opening 36 is formed to eliminate the necessity of separately attaching a loop handle to the body portion of a panel. In other words, the loop portion 12 is integrally formed with the cover portion of the body.

Figure 5:
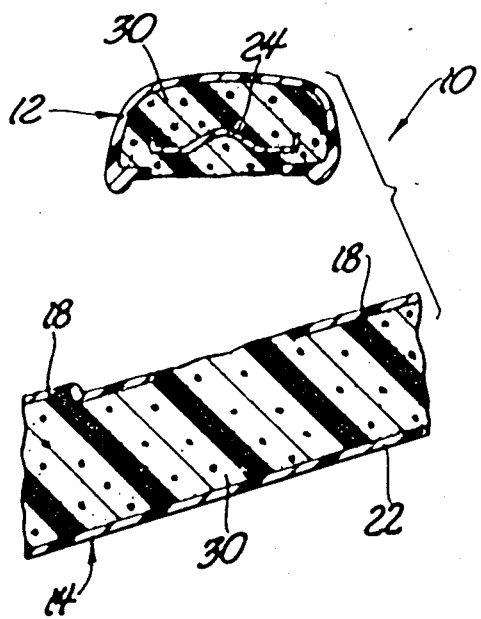
FIG. 5 is a cross-sectional view of the vehicle panel after the spaced sides of the skin have been removed.
Figure 6:
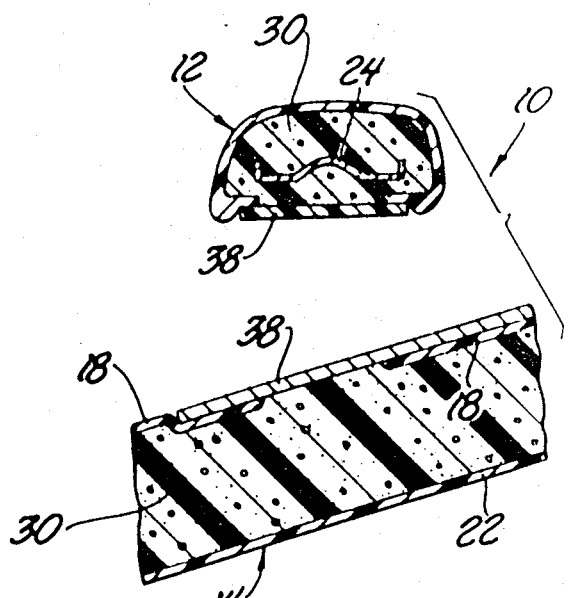
FIG. 6 is a cross-sectional view taken along line 6—6 of FIG. 2.

As best illustrated in FIG. 5, the removal of the sides 32 and cellular material 34 between the sides 32 exposes portions of the cellular material 30 in areas of the cover portion 18 and loop portion 12 which face each other. Cover means or plates 38 are secured over these exposed areas of cellular material 30 as shown in FIGS. 2 and 6. The cover means 38 are secured to the loop reinforcement member 24 by flathead screws 40. The cover plates 38 may be made of plastic or metal.

The support panel 22 with the loop reinforcement member 24 attached thereto may be placed in a mold in spaced relationship to the integral skin and, thus, foam material injected into the mold to define the body portion 14 of the panel, as well as the loop portion 12 as the cellular material 30 flows between the sides 32 to fill the head 34.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the invention may be practiced otherwise than as specifically described herein and yet remain within the scope of the appended claims.

The embodiments of the invention in which an exclusive property or privilege is claimed are defined as follows:

1. A method of fabricating a vehicle panel having a cellular core covered by a flexible skin with a handle loop defining an opening with opposite open ends characterized by forming a skin having a cover portion (18) with an integral loop (12) including a loop cavity (20) extending from the cover portion (18) with spaced sides (32) and an enlarged head (34) defining the outer periphery as viewed in cross section with the spaced sides (32) extending between the cover portion (18) and the enlarged head (34), disposing cellular material (30) along and adjacent the cover portion (18) and into the loop cavity (20), and removing a portion of the skin and cellular material (30) between the outer periphery of the loop portion (12) and the cover portion (18) to define a handle opening (36) with opposite open ends.

2. A method as set forth in claim 1 further characterized by removing all of the sides (32) and cellular material (30) with opposite open ends between the cover portion (18) and the enlarged head (34) to form spaced segments of exposed cellular material respectively in said loop and in said panel of the cover portion thereof.

3. A method as set forth in claim 2 further characterized by placing cover means (38) over the spaced segments of exposed cellular material (30) within the opening (36).

4. A method as set forth in claim 3 further characterized as disposing a support panel (22) adjacent the cellular material (30) along the cover portion (18) and disposing a reinforcement member (24) in the loop portion (12) and supported by the support panel (22) and disposing the cellular material (30) thereabout.

5. A method as set forth in claim 4 further characterized as attaching the cover means (38) to the reinforcement member (24).

6. A vehicle panel assembly comprising: a cellular body portion (14), a cellular handle loop portion (12) integral with said body portion (14) and defining a handle opening (36) with opposite open ends between said handle loop portion (12) and said body portion (14), a continuously formed flexible skin covering said body portion (14) and said loop portion (12), said skin being integral from said body portion (14) and through said loop portion (12).

7. An assembly as set forth in claim 6, including said handle loop portion (12) and said body portion (14) being devoid of said skin between the opposite open ends of said handle opening (36) so that said cellular material (30) is exposed within said handle opening (36).

8. An assembly as set forth in claim 7 including cover means (38) disposed over the areas of the loop portion (12) and the body portion (14) which are devoid of skin.

* * * * *